US010767785B2

(12) United States Patent
Taya et al.

(10) Patent No.: US 10,767,785 B2
(45) Date of Patent: Sep. 8, 2020

(54) PNEUMATICALLY-ACTUATED VALVE

(71) Applicant: IHI Corporation, Koto-ku (JP)

(72) Inventors: Kohei Taya, Tokyo (JP); Hatsuo Mori, Tokyo (JP); Tomoharu Oda, Tokyo (JP); Masanori Suzuki, Tokyo (JP)

(73) Assignee: IHI Corporation, Koto-ku (JP)

( * ) Notice: Subject to any disclaimer, the term of this patent is extended or adjusted under 35 U.S.C. 154(b) by 196 days.

(21) Appl. No.: 15/295,517

(22) Filed: Oct. 17, 2016

(65) Prior Publication Data
US 2017/0030476 A1    Feb. 2, 2017

Related U.S. Application Data

(63) Continuation of application No. PCT/JP2015/064048, filed on May 15, 2015.

(30) Foreign Application Priority Data

Jun. 25, 2014 (JP) ................. 2014-130568

(51) Int. Cl.
*F16K 31/126* (2006.01)
*F16K 1/12* (2006.01)
(Continued)

(52) U.S. Cl.
CPC .......... *F16K 31/1262* (2013.01); *F16K 1/126* (2013.01); *F16K 1/523* (2013.01); *F16K 27/02* (2013.01); *F16K 41/10* (2013.01)

(58) Field of Classification Search
USPC ................... 251/60, 284, 285, 288
See application file for complete search history.

(56) References Cited

U.S. PATENT DOCUMENTS 3,175,473 A * 3/1965 Boteler ............... F15B 15/10
                                                    137/316
3,815,867 A * 6/1974 Rein .................. B63C 11/22
                                                    251/61.3
(Continued)

FOREIGN PATENT DOCUMENTS

CN    1332657 A    1/2002
CN    103742701 A    4/2014
(Continued)

OTHER PUBLICATIONS

International Search Report dated Aug. 11, 2015 in PCT/JP2015/064048, filed on May 15, 2015 ( with English Translation).
(Continued)

*Primary Examiner* — Daphne M Barry
(74) *Attorney, Agent, or Firm* — Oblon, McClelland, Maier & Neustadt, L.L.P.

(57) ABSTRACT

A pneumatically-actuated valve is provided in which a spring member that applies an axial force to a shaft connected to a valve body, in an axial direction of the shaft, and a valve-actuating pressure chamber that actuates the valve body by applying a force resisting the axial force to the shaft are provided inside a valve casing. The pneumatically-actuated valve includes an axial-force adjusting device that adjusts the magnitude of energy stored in the spring member, via a surface-pressure adjusting screw provided to be inserted through the valve casing, from the outside of the valve casing.

6 Claims, 2 Drawing Sheets

(51) Int. Cl.
  *F16K 27/02* (2006.01)
  *F16K 41/10* (2006.01)
  *F16K 1/52* (2006.01)

(56) References Cited

U.S. PATENT DOCUMENTS

| | | | | |
|---|---|---|---|---|
| 3,978,884 | A * | 9/1976 | Sundstrom | F15B 11/123 |
| | | | | 137/495 |
| 3,985,151 | A * | 10/1976 | Smith | F15B 15/066 |
| | | | | 137/269 |
| 4,335,744 | A * | 6/1982 | Bey | F16K 17/04 |
| | | | | 137/522 |
| 4,572,477 | A * | 2/1986 | Phlipot | F17C 13/04 |
| | | | | 137/613 |
| 4,577,831 | A * | 3/1986 | DiBartolo | F16K 35/02 |
| | | | | 137/385 |
| 4,801,051 | A * | 1/1989 | Lewis | B05C 5/0237 |
| | | | | 222/309 |
| 5,004,011 | A * | 4/1991 | Linder | F16K 1/523 |
| | | | | 137/556 |
| 5,390,895 | A * | 2/1995 | Iwabuchi | F16K 31/1225 |
| | | | | 251/285 |
| 5,487,527 | A * | 1/1996 | Eggleston | F16K 31/1228 |
| | | | | 251/285 |
| 5,848,608 | A | 12/1998 | Ishigaki | |
| 6,007,045 | A * | 12/1999 | Heiniger | F16K 7/126 |
| | | | | 251/331 |
| 7,828,009 | B2 * | 11/2010 | Neumann | G05D 16/106 |
| | | | | 137/505.25 |
| 8,141,582 | B2 * | 3/2012 | Fukano | F16K 7/16 |
| | | | | 116/277 |
| 9,528,631 | B2 * | 12/2016 | McCarty | F16K 41/02 |
| 2002/0027211 | A1 | 3/2002 | Kajitani | |
| 2003/0201015 | A1 | 10/2003 | Fukano | |
| 2008/0149874 | A1 | 6/2008 | Fukano et al. | |
| 2014/0145099 | A1 | 5/2014 | Igarashi et al. | |
| 2015/0129054 | A1 * | 5/2015 | Simonsen | F15B 13/0426 |
| | | | | 137/486 |

FOREIGN PATENT DOCUMENTS

| | | |
|---|---|---|
| JP | 6-1753 U | 1/1994 |
| JP | 6-54975 U | 7/1994 |
| JP | 9-112736 | 5/1997 |
| JP | 10-143252 | 5/1998 |
| JP | 11-13541 | 1/1999 |
| JP | 2001-124235 | 5/2001 |
| JP | 2004-19792 | 1/2004 |
| JP | 2004-301318 | 10/2004 |
| JP | 2005-337488 A | 12/2005 |
| JP | 2006-308105 | 11/2006 |
| JP | 2008-157366 | 7/2008 |
| JP | 2008-286339 | 11/2008 |
| JP | 2009-199432 | 9/2009 |

OTHER PUBLICATIONS

Written Opinion dated Aug. 11, 2015 in PCT/JP2015/064048, filed on May 15, 2015.

* cited by examiner

PNEUMATICALLY-ACTUATED VALVE

This application is a continuation application based on a PCT Patent Application No. PCT/JP2015/064048, filed on May 15, 2015, whose priority is claimed on Japanese Patent Application No. 2014-130568, filed on Jun. 25, 2014. The contents of both the PCT Application and the Japanese Application are incorporated herein by reference.

TECHNICAL FIELD

Embodiments described herein relates to a pneumatically-actuated valve.

BACKGROUND ART

Japanese Unexamined Patent Application, First Publication No. 2004-301318 discloses a pneumatically-actuated valve for a rocket engine used in space development. In such a pneumatically-actuated valve, typically, the flow of a fluid (for example, a propellant) that flows in from an inlet pipe is controlled by opening and closing of a poppet.

In a closed state, the poppet is sealed by being pressed against a seat surface with a specified axial force by a spring built into a valve casing, and thereby leakage of the fluid to a downstream side is prevented. On the other hand, in an open state, an actuating gas is supplied to a pressure chamber within the valve casing with a specified pressure, and a diaphragm is pushed up, and thereby, the poppet is separated from the seat surface and the fluid flows to the downstream side.

SUMMARY

The amount of internal leakage to the downstream side of a pneumatically-actuated valve has a correlation with the pressing force of the poppet against the seat surface, and a strong pressing force may be required depending on fluid types or operating conditions (temperature, shock, vibration, and the like). However, an excessive pressing force may cause creeping of the seat surface, and needs to be adjusted depending on the quality of the seat surface.

Meanwhile, once related-art pneumatically-actuated valves are manufactured, specifications, such as the surface pressure, cannot be changed, and the performance becomes fixed. For this reason, in the related art, it is necessary to develop valves individually according to the operation conditions or the like of rocket engines, or first disassemble a valve and then replace a component (a spring or the like), and there are great restrictions in respect to effort, time, and cost.

The present disclosure has been made in view of the above problems, and an object thereof is to provide a pneumatically-actuated valve for which the specifications of the valve can be easily adjusted.

In order to solve the above problems, a first aspect related to the present disclosure is a pneumatically-actuated valve in which a spring member that applies an axial force to a shaft connected to a valve body, in an axial direction of the shaft, and a valve-actuating pressure chamber that actuates the valve body by applying a force resisting the axial force to the shaft are provided inside a valve casing. The pneumatically-actuated valve includes an axial-force adjusting device that adjusts the magnitude of energy stored in the spring member, via a screw member provided to be inserted through the valve casing, from the outside of the valve casing.

Therefore, in the present disclosure, the magnitude of energy stored in the spring member that applies an axial force can be easily adjusted from the outside of the valve casing by the screw member provided to be inserted through the valve casing from the outside of the valve casing. For this reason, surface pressure setting tailored to fluid types or operating conditions is enabled, for example, without disassembling the valve.

According to the invention, a pneumatically-actuated valve for which the specifications of the valve can be adjusted is obtained.

DESCRIPTION OF EMBODIMENTS

Hereinafter, a pneumatically-actuated valve related to the present disclosure will be described with reference to the drawings. In addition, in the following drawings, scales of respective members are appropriately changed in order to make respective members have recognizable sizes. Additionally, in the following embodiments a pneumatically-actuated valve for a rocket engine will be shown and described.

Figure 1:
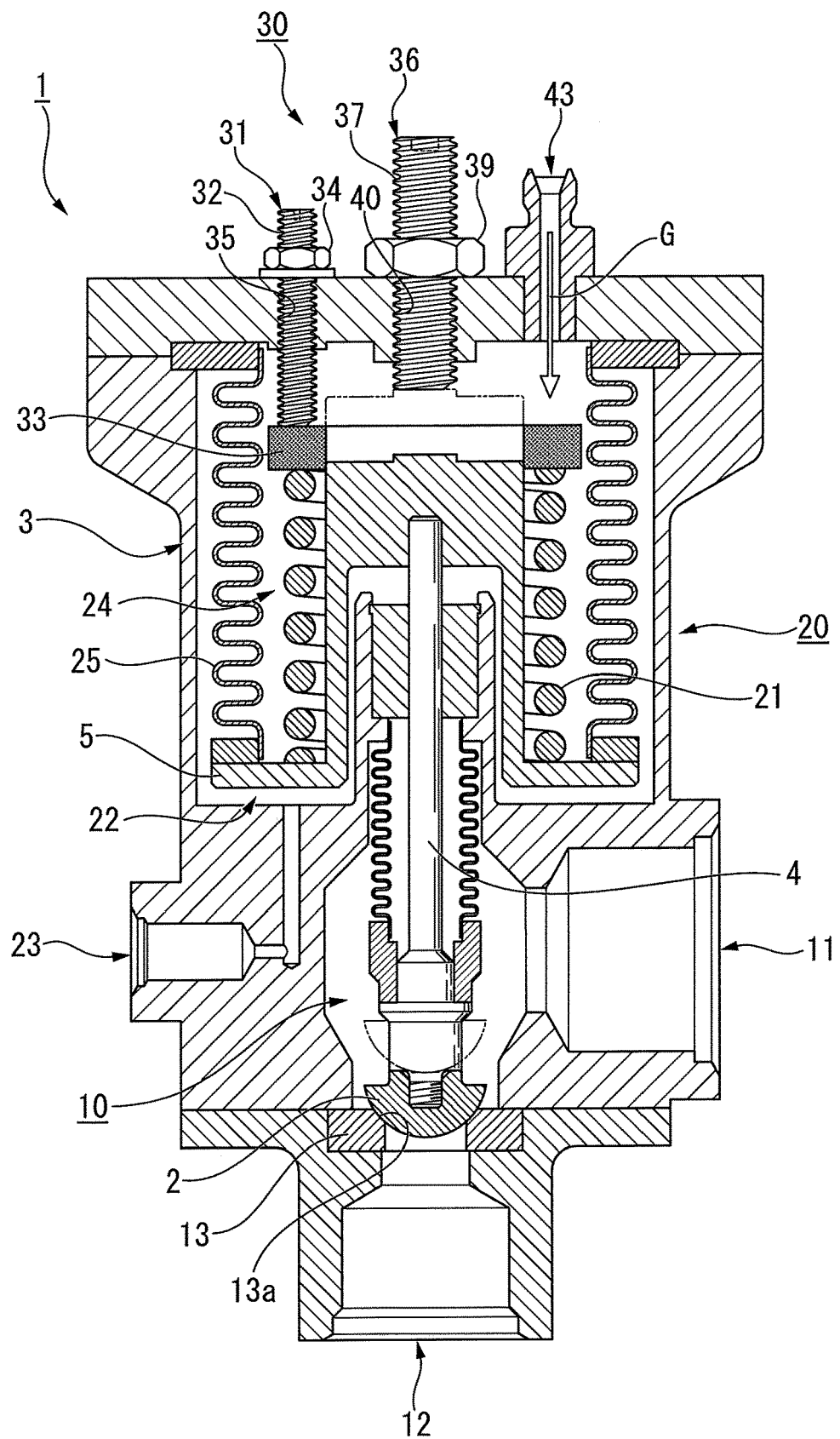
FIG. 1 is a configuration view of a pneumatically-actuated valve in an embodiment of the present disclosure.
Figure 2:
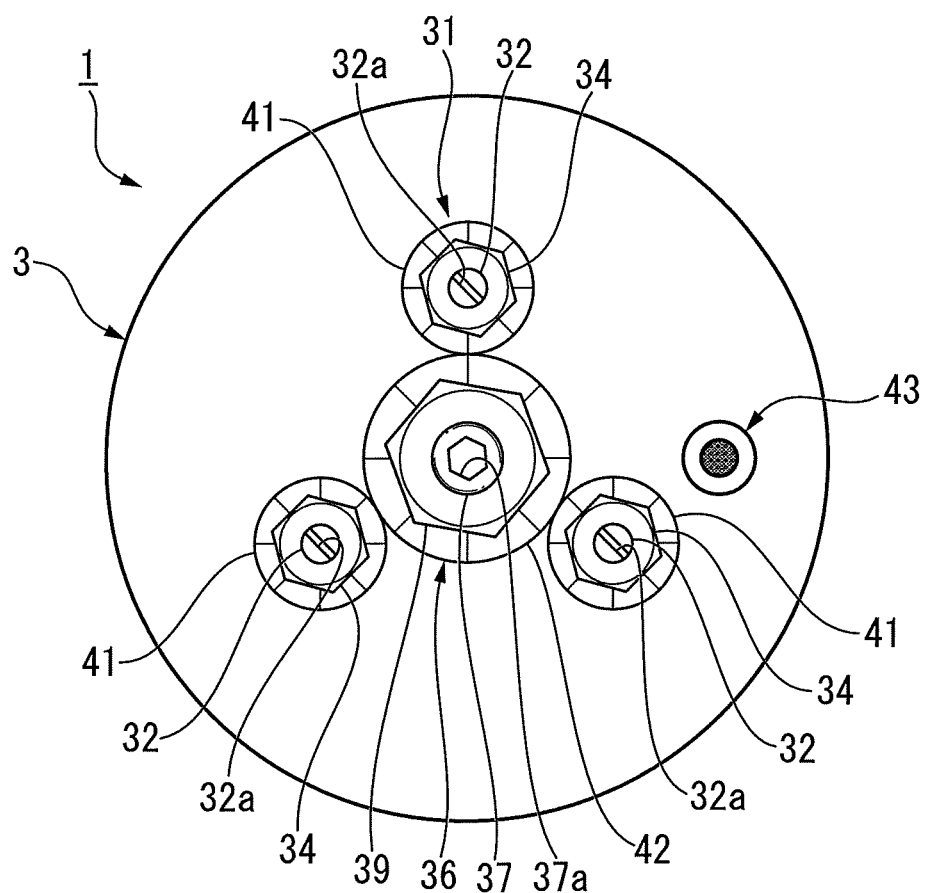
FIG. 2 is a plan view of the pneumatically-actuated valve in the embodiment of the present disclosure.

FIG. 1 is a configuration view of a pneumatically-actuated valve 1 in an embodiment of the present disclosure. FIG. 2 is a plan view of the pneumatically-actuated valve 1 in the embodiment of the present disclosure.

A pneumatically-actuated valve 1 of the present embodiment is a propellant valve for a rocket engine, and controls the flow of a fluid that is a propellant (an oxidizer/fuel).

The pneumatically-actuated valve 1 has a flow passage part 10 in which a valve body 2 that controls the flow of a fluid is arranged, an actuator part 20 that actuates the valve body 2, and a specification adjusting part 30 that adjusts the specifications of the valve.

The flow passage part 10 is provided inside a valve casing 3. The fluid flows into the flow passage part 10 from a flow passage inlet 11 and flows out of a flow passage outlet 12. The flow passage outlet 12 is provided with a seat member 13. The seat member 13 is a main seal, and has a seat surface 13a against which the valve body 2 is pressed.

The actuator part 20 is provided inside the valve casing 3. The actuator part 20 has a spring member 21 that applies an axial force in an axial direction to a shaft 4 connected to the valve body 2. The spring member 21 presses the valve body 2 against the seat surface 13a with a specified axial force. Accordingly, the flow passage outlet 12 is liquid-tightly sealed, and leakage of the fluid to a downstream side is prevented. In the present embodiment, a coil spring is adopted as the spring member 21.

The shaft 4 is connected to a diaphragm 5. A valve-actuating pressure chamber 22 that applies a force against the axial force to the shaft 4 via the diaphragm 5 and actuates the valve body 2 is provided inside the valve casing 3. The valve-actuating pressure chamber 22 communicates a gas port 23 for actuation.

The gas port 23 for actuation is a flow passage that allows an actuating gas to be supplied and exhausted therethrough. If the actuating gas is supplied and the inside of the valve-actuating pressure chamber 22 reaches a specified pressure, the diaphragm 5 is pushed up against the axial force. Accordingly, the valve body 2 is separated from the seat surface 13a and the fluid flows to the downstream side.

A spring accommodating chamber 24 that is airtightly partitioned off from the valve-actuating pressure chamber 22 and accommodates the spring member 21 is provided inside the valve casing 3. The spring accommodating chamber 24 is partitioned off from the valve-actuating pressure chamber 22 by an extensible partition wall 25. The extensible partition wall 25 is an extensible wavy bellows, and demarcates the spring accommodating chamber 24. The space capacity of the spring accommodating chamber 24 varies because the extensible partition wall 25 is extended and retracted in the axial direction if the diaphragm 5 is actuated.

The specification adjusting part 30 has an axial force adjusting device 31 that adjusts the magnitude of energy stored in the spring member 21 via a surface-pressure adjusting screw (screw member) 32 provided to be inserted through the valve casing 3 from the outside of the valve casing 3.

The axial force adjusting device 31 of the present embodiment has the surface-pressure adjusting screw 32, a spring retainer 33, and a detent nut 34. The surface-pressure adjusting screw 32 is a set screw (push screw) that is threadedly engaged with a screw hole 35 provided in the valve casing 3.

The screw hole 35 allows the outside of the valve casing 3 and the spring accommodating chamber 24 to communicate with each other in the axial direction. The surface-pressure adjusting screw 32 is threadedly engaged with the screw hole 35, and has one end provided to protrude to the spring accommodating chamber 24 inside the valve casing 3. One end of the surface-pressure adjusting screw 32 comes into contact with the surface-pressure adjusting screw 32 via the spring retainer 33. The spring retainer 33 is a ring-shaped member, and comes into contacts a plurality of the surface-pressure adjusting screws 32 (refer to FIG. 2), respectively. The spring retainer 33 decentralizes a partial load from each surface-pressure adjusting screw 32, and applies a uniform surface pressure load to the spring member 21.

The other end of the surface-pressure adjusting screw 32 is exposed to the outside of the valve casing 3. As shown in FIG. 2, a groove 32a for a screwdriver is formed at the other end of the surface-pressure adjusting screw 32. For this reason, the amount of screwing of the surface-pressure adjusting screw 32 can be adjusted from the outside of the valve casing 3. The detent nut 34 is used for the detent of the surface-pressure adjusting screw 32, and is fastened outside the valve casing 3 after the adjustment of the amount of screwing.

Referring back to FIG. 1, the specification adjusting part 30 further has a valve stroke adjusting device 36 that adjusts the actuation stroke of the valve body 2 via a mechanical stroke adjusting screw (second screw member) 37 provided to be inserted through the valve casing 3 from the outside of the valve casing 3. The valve stroke adjusting device 36 of the present embodiment has the mechanical stroke adjusting screw 37 and a detent nut 39. The mechanical stroke adjusting screw 37 of the present embodiment is threadedly engaged with a screw hole (second screw hole) 40 provided in the valve casing 3.

The screw hole 40 allows the outside of the valve casing 3 and the spring accommodating chamber 24 to communicate with each other in the axial direction. The mechanical stroke adjusting screw 37 is threadedly engaged with the screw hole 40, and has one end provided to protrude to the spring accommodating chamber 24 inside the valve casing 3. The one end of the mechanical stroke adjusting screw 37 is arranged to face the shaft 4 in the axial direction. The amount of stroke until the movement of the shaft 4 is stopped due to the contact of the shaft 4 with the mechanical stroke adjusting screw 37 reaches the amount of a gap up to the valve body 2 apart from the seat surface 13a, and the flow rate of the fluid that flows through the valve is specified depending on the magnitude of the amount of the gap.

The other end of the mechanical stroke adjusting screw 37 is exposed to the outside of the valve casing 3.

As shown in FIG. 2, a groove 37a for a screwdriver is formed at the other end of the mechanical stroke adjusting screw 37.

For this reason, the amount of screwing of the mechanical stroke adjusting screw 37 can be adjusted from the outside of the valve casing 3. The detent nut 39 is used for the detent of the mechanical stroke adjusting screw 37, and is fastened outside the valve casing 3 after the adjustment of the amount of screwing.

As shown in FIG. 2, in the plan view, the mechanical stroke adjusting screw 37 is arranged at the center of the valve casing 3.

Additionally, in the plan view, the plurality of surface-pressure adjusting screws 32 are arranged around the mechanical stroke adjusting screw 37.

In the present embodiment, three surface-pressure adjusting screws 32 are provided. The surface-pressure adjusting screws 32 are arranged at regular intervals (at intervals of 120° in the present embodiment) in a circumferential direction in order to equally apply loads to the spring member 21 (spring retainer 33).

Graduations (measurement graduations) 41 for surface pressure adjustment for allowing measurement of the rotational angle of the surface-pressure adjusting screw 32, graduations (second measurement graduations) 42 for mechanical stroke adjustment for allowing measurement of the rotational angle of the mechanical stroke adjusting screw 37 are provided outside the valve casing 3. Markings, mark-off lines, or the like that are not shown are given to the surface-pressure adjusting screw 32 and the mechanical stroke adjusting screw 37, and the rotational angle (the amount of specification adjustment) can be measured by the positional relationship between these adjusting screws and the respective graduations 41 and 42. In addition, for example, the minus shape of the groove 32a, or the like may be used instead of the markings, the mark-off lines, or the like.

As shown in FIG. 1, the spring accommodating chamber 24 communicates with a gas purge port 43. The gas purge port 43 allows a purge gas G to be introduced into the spring accommodating chamber 24 therethrough so as to gas-purge the inside of the spring accommodating chamber 24 with the purge gas. The purge gas G introduced into the spring accommodating chamber 24 flows out to the outside of the valve casing 3 via a minute gap between the surface-pressure adjusting screw 32 and the screw hole 35. Additionally, the purge gas G flows out to the outside of the valve casing 3 via a minute gap between the mechanical stroke adjusting screw 37 and the screw hole 40. In the present embodiment, helium gas is adopted as the purge gas G. In addition, inert gas other than helium gas, such as nitrogen gas, can also be used as the purge gas G.

Subsequently, the operation of the pneumatically-actuated valve 1 having the above configuration will be described.

The pneumatically-actuated valve 1 of the present embodiment has the axial force adjusting device 31 that adjusts the magnitude of energy stored in the spring member 21 via the surface-pressure adjusting screw 32 provided to be inserted through the valve casing 3 from the outside of the valve casing 3. For this reason, in the present embodiment, the magnitude of energy stored in the spring member 21 that applies an axial force can be easily adjusted from the outside of the valve casing 3 by turning the surface-pressure adjusting screw 32 provided to be inserted through the valve casing 3 from the outside of the valve casing 3, viewing the graduations 41 for surface pressure adjustment.

For this reason, seat surface pressure at the time of closing actuation can be adjusted, for example, without disassembling the valve. The amount of internal leakage to the downstream side of the valve has a correlation with the pressing force of the valve body 2 against the seat surface 13a, and the adjustment thereof is required depending on fluid types or operating conditions. Additionally, in a case where the pressing force of the valve body 2 against the seat surface 13a is excessive, the seat surface 13a may creep, and the amount of internal leakage also needs to be adjusted depending on the materials of the seat member 13.

By providing this axial force adjusting device 31, the specification (surface pressure setting) of the valve can be easily adjusted, for example, in a case where fluid types, service temperature, conditions, or the like are changed after valve assembly, in a case where it is confirmed that the amount of internal leakage is greater than a specified amount, at the time of a test after valve assembly, and the like.

Additionally, in the present embodiment, the spring accommodating chamber 24 that is airtightly partitioned off from the valve-actuating pressure chamber 22 and accommodates the spring member 21 is provided inside the valve casing 3, and the surface-pressure adjusting screw 32 is threadedly engaged with the screw hole 35 that allows the outside of the valve casing 3 and the spring accommodating chamber 24 to communicate with each other therethrough. The minute gap is formed between the surface-pressure adjusting screw 32 and the screw hole 35. For example, if this gap is formed in the valve-actuating pressure chamber 22, the actuating gas may leak from the gap and may influence pressure control. Meanwhile, in the present embodiment, the surface-pressure adjusting screw 32 is threadedly engaged with the screw hole 35 that communicates with the spring accommodating chamber 24. Therefore, occurrence of such a problem that the actuating gas of the valve-actuating pressure chamber 22 leaks is prevented.

Additionally, the pneumatically-actuated valve 1 of the present embodiment has the gas purge port 43 that allows a purge gas to be introduced into the spring accommodating chamber 24 therethrough so as to gas-purge the inside of the spring accommodating chamber 24 via the gap between the surface-pressure adjusting screw 32 and the screw hole 35. In a case where an ultralow temperature fluid (for example, liquid hydrogen) is treated as the fluid, the valve casing 3 itself is also cooled, for example to about −200°. Then, a problem in which the contamination (moisture or the like contained in air) that has entered the spring accommodating chamber 24 via the gap between the surface-pressure adjusting screw 32 and the screw hole 35 freezes may occur.

Additionally, ambient air may enter the spring accommodating chamber 24 via a screw gap, for example, due to a pressure drop caused by the temperature of the valve casing 3 dropping from tens of degrees to minus hundreds of degrees and due to a pressure drop caused by a capacity change resulting from the actuation of the diaphragm 5. In the present embodiment, gas purge is performed by the gas purge port 43, and a slight amount of the purge gas G is always made to flow out from the screw gap to the outside the valve casing 3. For this reason, in a case where the entering of ambient air into the valve casing 3 is prevented and it treats an ultralow temperature fluid, generation of the malfunction such as the moisture freezing included in the ambient air inside the valve casing 3 is prevented.

Moreover, the pneumatically-actuated valve 1 of the present embodiment has the valve stroke adjusting device 36 that adjusts the actuation stroke of the valve body 2 via the mechanical stroke adjusting screw 37 provided to be inserted through the valve casing 3 from the outside of the valve casing 3. For this reason, in the present embodiment, the actuation stroke of the valve body 2 can be adjusted from the outside of the valve casing 3 by turning the mechanical stroke adjusting screw 37 provided to be inserted into the valve casing 3 from the outside of the valve casing 3, viewing the graduations 42 for mechanical stroke adjustment.

For this reason, the amount of stroke at the time of opening actuation can be adjusted, for example, without disassembling the valve. Change of the amount of stroke becomes change of the gap between valve body 2 and the seat surface 13a at the time of opening actuation. Then, since the flow rate of the fluid that flows through the valve is adjusted, the coefficient of discharge (Cv value) that is one of main specifications of the valve becomes variable. Additionally, the amount of stroke is also related to the lifespan of a bellows component, such as the extensible partition wall 25. That is, the lifespan and the Cv value have an inverse proportional relationship, and the lifespan is extended if the flow rate is reduced. For this reason, the valve stroke adjusting device 36 can easily adjust the specification (the flow of the fluid, the lifespan of a functional part) of the valve.

Additionally, the mechanical stroke adjusting screw 37 is threadedly engaged with the screw hole 40 that allows the outside of the valve casing 3 and the spring accommodating chamber 24 to communicate with each other. For this reason, occurrence of leakage of the actuating gas and occurrence of freeze of contamination are prevented similar to the case of the surface-pressure adjusting screw 32.

Therefore, according to the above-described present embodiment, the pneumatically-actuated valve 1 for which adjust the specifications of the valve can be adjusted is obtained.

Although the preferred embodiment of the present disclosure has been described above referring to the drawings, the present disclosure is not limited to the above-described embodiment. Various shapes or combinations of the respective constituent members that are shown in the above-described embodiment, are examples, and can be variously changed on the basis of design requirements or the like without departing from the spirit of the present disclosure.

For example, although the coil spring has been shown and described as the spring member 21 in the above embodiment, the present disclosure is not limited to this configuration, and may be, for example, a disk spring. In the disk spring, it is possible to add a large load with a small space and a small amount of deflection as compared with a coil spring. Therefore, a housing (valve casing 3) of the valve can be made small, and the weight of the housing can be reduced as the housing becomes smaller. That is, in single springs, although the coil spring is lighter, the overall valve becomes lighter if the disk spring is used. Additionally, with respect to other advantages, the disk spring can be suitably used for adjustment of use of the valve, similar to the coil spring that has already been described.

Additionally, for example, although the pneumatically-actuated valve for a rocket engine has been shown and described in the above embodiment, the present disclosure is not limited to the above embodiment. For example, the present disclosure can be used for a pneumatically-actuated valve of a supply system of a facility for testing a rocket engine.

Additionally, in a second aspect related to the present disclosure, a spring accommodating chamber that is airtightly partitioned off from the valve-actuating pressure chamber and accommodates the spring member is provided inside the valve casing, and the screw member is threadedly engaged with a screw hole that allows the outside of the valve casing and the spring accommodating chamber to communicate with each other therethrough.

Additionally, in a third aspect related to the present disclosure, the pneumatically-actuated valve further includes a gas purge port that allows a purge gas to be introduced into the spring accommodating chamber therethrough so as to gas-purge the inside of the spring accommodating chamber via a gap between the screw member and the screw hole.

Additionally, in a fourth aspect related to the present disclosure, measurement graduations for allowing measurement of a rotational angle of the screw member are provided outside the valve casing.

Additionally, in a fifth aspect related to the present disclosure, the pneumatically-actuated valve further includes a valve stroke adjusting device that adjusts an actuation stroke of the valve body via a second screw member provided to be inserted through the valve casing from the outside of the valve casing.

Additionally, in a sixth aspect related to the present disclosure, a spring accommodating chamber that is airtightly partitioned off from the valve-actuating pressure chamber and accommodates the spring member is provided inside the valve casing, and the second screw member is threadedly engaged with a second screw hole that allows the outside of the valve casing and the spring accommodating chamber to communicate with each other therethrough.

Additionally, in a seventh aspect related to the present disclosure, second measurement graduations for allowing measurement of a rotational angle of the second screw member are provided outside the valve casing.

While preferred embodiments of the present disclosure have been described and shown above, it should be understood that these are exemplary of the present disclosure and are not to be considered as limiting. Additions, omissions, substitutions, and other modifications can be made without departing from the spirit or scope of the present disclosure. Accordingly, the present disclosure is not to be considered as being limited by the foregoing description, and is only limited by the scope of the appended claims.

INDUSTRIAL APPLICABILITY

According to the present disclosure, the pneumatically-actuated valve for which the specifications of the valve can be adjusted is obtained.

What is claimed is:

1. A pneumatically-actuated valve comprising:
a valve body;
a shaft connected to the valve body;
a spring member that is provided inside a valve casing and applies an axial force to the shaft in an axial direction of the shaft;
a valve-actuating pressure chamber that is provided inside the valve casing and actuates the valve body by applying a force resisting the axial force to the shaft; and
an axial-force adjusting device that has a plurality of screw members and a ring-shaped spring retainer, the plurality of screw members being provided to be inserted through the valve casing, the spring retainer being provided inside the valve casing and coming into contact with one end of each of the plurality of screw members, in which the plurality of screw members face the spring member with the spring retainer interposed therebetween, and that adjusts the magnitude of energy stored in the spring member, via the plurality of screw members, from the outside of the valve casing,
wherein the spring member is disposed around an axis of the shaft,
wherein the plurality of screw members are arranged at regular intervals in a circumferential direction of the spring member, and thereby apply equal loads to the spring member,
wherein a spring accommodating chamber that is airtightly partitioned off from the valve-actuating pressure chamber and accommodates the spring member is provided inside the valve casing, and
wherein each screw member of the plurality of screw members is threadedly engaged with a respective screw hole that allows the outside of the valve casing and the spring accommodating chamber to communicate with each other therethrough,
wherein the pneumatically-actuated valve further comprises a gas purge port that allows a purge gas to be introduced into the spring accommodating chamber therethrough so as to gas-purge the inside of the spring accommodating chamber,
wherein a gap is formed between each screw member of the plurality of screw members and the respective screw hole, and
wherein the purge gas introduced into the spring accommodating chamber flows out to the outside of the valve casing via the gap.

2. The pneumatically-actuated valve according to claim 1, wherein measurement graduations for allowing measurement of a rotational angle of each screw member of the plurality of screw members are provided outside the valve casing.

3. The pneumatically-actuated valve according to claim 1, further comprising:
a valve stroke adjusting device that adjusts an actuation stroke of the valve body via a second screw member provided to be inserted through the valve casing from the outside of the valve casing.

4. The pneumatically-actuated valve according to claim 3, wherein the second screw member is threadedly engaged with a second screw hole that allows the outside of the valve casing and the spring accommodating chamber to communicate with each other therethrough.

5. The pneumatically-actuated valve according to claim 4, wherein second measurement graduations for allowing measurement of a rotational angle of the second screw member are provided outside the valve casing.

6. The pneumatically-actuated valve according to claim 1, further comprising a diaphragm connected to the shaft, wherein the valve-actuating pressure chamber applies the force resisting the axial force to the shaft via the diaphragm.

* * * * *